(12) United States Patent
Madhani et al.

(10) Patent No.: US 9,298,780 B1
(45) Date of Patent: Mar. 29, 2016

(54) METHOD AND SYSTEM FOR MANAGING USER CONTRIBUTED DATA EXTRACTION TEMPLATES USING WEIGHTED RANKING SCORE ANALYSIS

(71) Applicant: Intuit Inc., Mountain View, CA (US)

(72) Inventors: Sunil Madhani, Mountain View, CA (US); Anu Sreepathy, Bangalore (IN); Mithun U. Shenoy, Bangalore (IN)

(73) Assignee: Intuit Inc., Mountain View, CA (US)

( * ) Notice: Subject to any disclaimer, the term of this patent is extended or adjusted under 35 U.S.C. 154(b) by 157 days.

(21) Appl. No.: 14/069,871

(22) Filed: Nov. 1, 2013

(51) Int. Cl.
    *G06F 7/00*     (2006.01)
    *G06F 17/30*     (2006.01)

(52) U.S. Cl.
    CPC .................................. *G06F 17/3053* (2013.01)

(58) Field of Classification Search
    CPC ............ G06F 17/248; G06F 17/30253; G06F 17/30616
    USPC ........................................................ 707/748
    See application file for complete search history.

(56) References Cited

U.S. PATENT DOCUMENTS

| | | | | | |
|---|---|---|---|---|---|
| 6,154,737 | A | * | 11/2000 | Inaba .................. | G06F 17/3069 707/696 |
| 6,778,703 | B1 | * | 8/2004 | Zlotnick ............ | G06K 9/00449 382/218 |
| 7,149,347 | B1 | * | 12/2006 | Wnek ................. | G06K 9/00469 382/159 |
| 7,469,270 | B1 | * | 12/2008 | Kirkpatrick ........... | G06F 17/243 709/203 |
| 7,624,053 | B1 | * | 11/2009 | Molotsi .................. | G06Q 40/00 705/35 |
| 8,285,058 | B2 | * | 10/2012 | Sarkar ................ | G06K 9/00442 329/209 |
| 8,918,403 | B2 | * | 12/2014 | Liu ...................... | G06F 17/3089 707/748 |
| 2007/0168382 | A1 | * | 7/2007 | Tillberg ............ | G06F 17/30253 |
| 2010/0161460 | A1 | | 6/2010 | Vroom et al. | |
| 2011/0255791 | A1 | * | 10/2011 | Abdo ........................ | G06T 1/60 382/199 |
| 2011/0314041 | A1 | * | 12/2011 | Drucker ................. | G06Q 30/02 707/769 |
| 2013/0091162 | A1 | * | 4/2013 | Lewak .............. | G06F 17/30392 707/769 |
| 2014/0089302 | A1 | * | 3/2014 | Lapir .................. | G06F 17/3053 707/723 |
| 2015/0078671 | A1 | * | 3/2015 | van Deventer ..... | G06K 9/00449 382/217 |

OTHER PUBLICATIONS

Madhani et al., "Method and System for Document Data Extraction Template Management," U.S. Appl. No. 14/069,795, filed Nov. 1, 2013.

* cited by examiner

*Primary Examiner* — Binh V Ho
(74) *Attorney, Agent, or Firm* — Hawley Troxell Ennis & Hawley LLP; Philip McKay

(57) ABSTRACT

User weighted data indicating acceptance of a given data extraction template and weighted data indicating the number of data fields that the data extraction template can extract accurately is used to calculate data extraction template ranking, or a weighted ranking score, to be associated with the data extraction template. Then the data extraction template having the highest data extraction template ranking score is used in a first attempt to extract data from a source documents of the source document type associated with the data extraction templates. As more data extraction templates associated with a given source document type are received, the data extraction templates having the lowest data extraction template ranking scores are detected/eliminated.

35 Claims, 3 Drawing Sheets

METHOD AND SYSTEM FOR MANAGING USER CONTRIBUTED DATA EXTRACTION TEMPLATES USING WEIGHTED RANKING SCORE ANALYSIS

BACKGROUND

While the use of data management systems has increased significantly over the past decade, one long standing problem, and barrier to entry, for providers of data management systems is how to provide potential users of the data management systems the functionality and features of the data management systems, without requiring significant user data entry, and/or other significant user interaction, with the data management systems.

Current data management systems include, but are not limited to, any of the following: a computing system implemented, or Internet-based, personal and/or business financial transaction management system; a computing system implemented, or Internet-based, personal and/or business financial management system; a computing system implemented, or Internet-based, personal and/or business asset management system; a computing system implemented, or Internet-based, personal and/or business accounting system; a computing system implemented, or Internet-based, point of sale system; a computing system implemented, or Internet-based, personal and/or business tax preparation system; a computing system implemented, or Internet-based, healthcare management system; and/or any of the numerous computing system implemented, or Internet-based, financial management systems known to those of skill in the art.

Efforts to minimize user data entry associated with the data management systems is often complicated by the problem of data extraction from various user documents. Data extraction from documents, both structured and unstructured, has inherent and long standing problems and complications that make potential users of many data systems hesitant to use data management systems. One current method of data extraction is to generate various data extraction templates used to identify data fields within documents. However, these data extraction templates are typically specially designed and tailored to specific source documents, or, at best, source document types. Consequently, it is not practical for a provider of a data management system to create data extraction templates for every type and format of document the data management system may encounter. Consequently, in many cases, the provider of a data management system may encourage users of the data management system to contribute/take part in the creation of data extraction templates for unknown document formats, such as Tax documents, that often have a long tail of unstructured formats.

While this user contribution approach can be effective, the user contribution is entirely voluntary and a single user may not contribute everything that is necessary to create a full data extraction template which can extract all required fields/data in a particular document. In addition, it may also be the case that not all fields are present in the source document that the user is using as a reference for data extraction template creation. For example, one invoice from a given vendor for which a user is creating a data extraction template may not have a "terms" field while another invoice, from the same vendor, may have a "terms" field.

In addition, as data extraction templates are created for the same vendor, and/or source document type, it becomes imperative to manage these data extraction templates, identify the most relevant data extraction templates, and discard redundant, and/or outdated, data extraction template data. However, currently, there is no efficient, effective, and user friendly means or mechanism for doing this.

SUMMARY

In accordance with one embodiment, a method and system for managing user contributed data extraction templates using weighted ranking score analysis includes determining a required number of data fields for which data is required to be extracted for a specific source document type and generating required number of fields data for the specific source document type. In one embodiment, data extraction template data representing a data extraction template associated with the specific source document type is then received, and/or generated.

In one embodiment, field hit count number data associated with the data extraction template indicating the number of data fields from which data can be extracted from the specific source document type using the data extraction template is determined. Data field ratio term data for the data extraction template is generated for the data extraction template and data field count weighting factor data is then generated and assigned to the data extraction template.

In one embodiment, data acceptance count data associated with the data extraction template indicating the number of times the data extracted from received source documents of the specific source document type using the data extraction template is accepted is determined. Data acceptance ratio term data for the data extraction template is then generated. In one embodiment data acceptance weighting factor data is then generated and assigned to the data extraction template.

In one embodiment, the data field ratio term data for the data extraction template, the data field count weighting factor data assigned to the data extraction template, the data acceptance ratio term data for the data extraction template, and the data acceptance weighting factor data assigned to the data extraction template is then processed and transformed into data extraction template ranking score data for the data extraction template. In one embodiment, the data extraction template data and the data extraction template ranking score data for the data extraction template is then stored as ranked data extraction template data.

In one embodiment, ranked data extraction template data associated with two or more data extraction templates associated with the specific source document type are then aggregated and stored for use with new source documents of the specific source document type.

Figure 1:
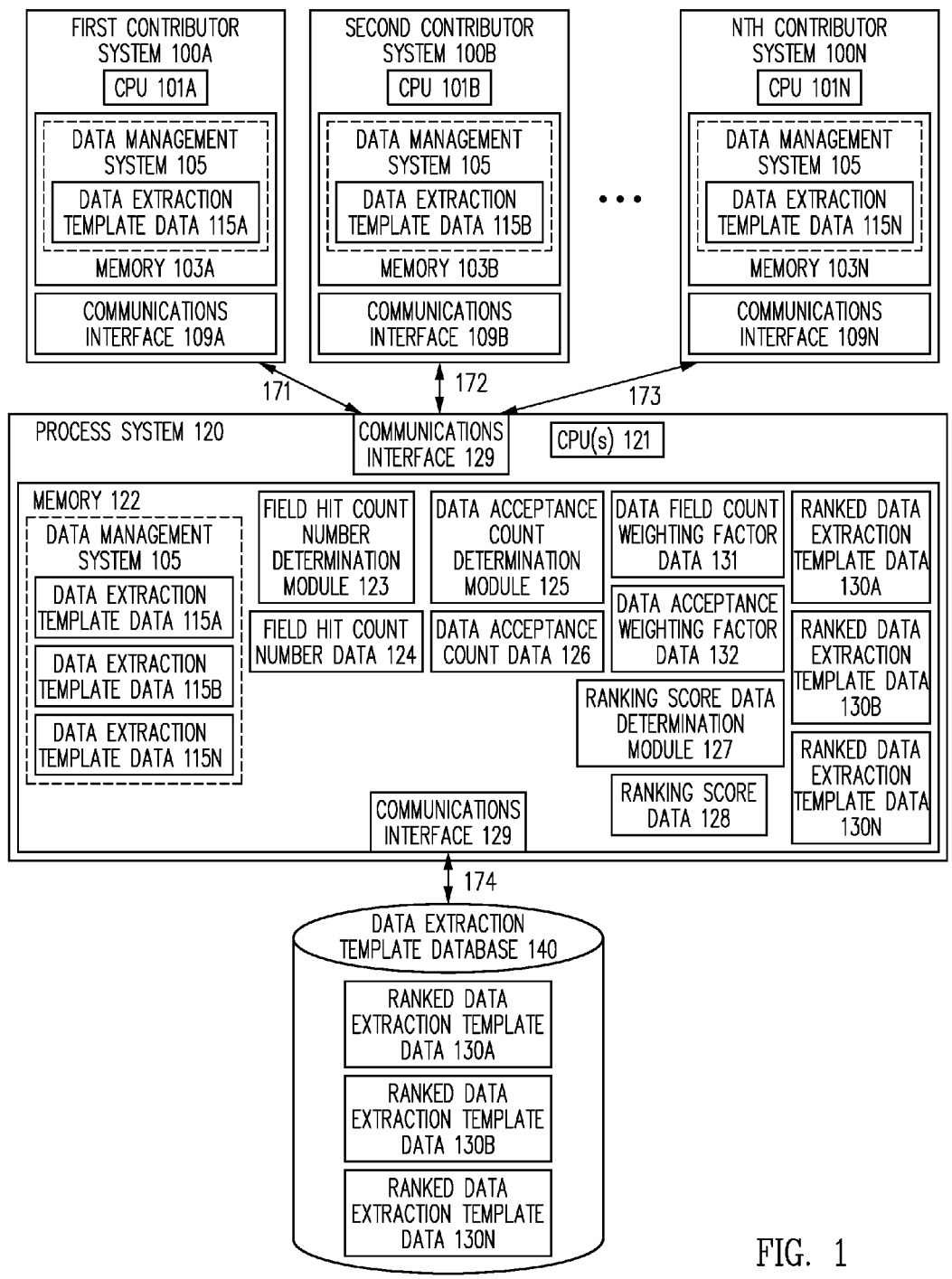
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for managing user contributed data extraction templates using weighted ranking score analysis includes a process for managing user contributed data extraction templates using weighted ranking score analysis implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, the process for managing user contributed data extraction templates using weighted ranking score analysis is part of, linked to, or otherwise associated with, one or more data and/or financial management systems used by one or more individuals/users.

Herein, a financial management system can be, but is not limited to, any data management system implemented on a computing system and/or accessed through a network, that processes data, including but not limited to, financial data, tax data, etc., from one or more sources.

Herein, the term "financial management system" can denote, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

In one embodiment, individuals employing a data management system, such as, but not limited to, a financial management system, are provided the capability to create and/or modify data extraction templates used to extract data from specific types of source documents. In one embodiment, individual/user contribution for creating data extraction templates for use in extracting data from new/unknown source document types, or to extract new data from known source document types, is solicited by a provider of a data management system associated with the system and method for managing user contributed data extraction templates using weighted ranking score analysis.

In various embodiments, the specific types of source documents include, but are not limited to, invoices, bills, and/or account statements from specific parties and/or financial institutions; various tax forms, and/or tax related documents, related to federal, state, and/or local taxes; various healthcare related documents and forms associated with specific healthcare service providers and/or healthcare insurance providers; various income and/or expense statements associated with specific employers and/or financial institutions; and/or any other source documents as discussed herein, and/or as known in the art at the time of filing, and/or as developed/made available after the time of filing that include data that is to be extracted using a data extraction template for use by a data management system.

In one embodiment, it is assumed that the data management system, or other application, that needs data from source documents includes data indicating the type of data required, e.g., the data fields required. For example, it is assumed a small business financial management system's import invoice feature includes data indicating that fields containing due date data, amount due data, etc., need to have this data extracted.

In one embodiment, the data fields/data required by the data management system, or other application, is used to determine a required number of data fields for which data is required to be extracted for a specific source document type and to generate required number of fields data for the specific source document type.

In one embodiment, baseline data associated with the extraction of data from specific types of source documents is provided and used to create initial, or baseline, data extraction templates. In one embodiment, the initial, or baseline, data extraction templates are used to encourage/entice users of a data management system, or application, associated with the method and system for managing user contributed data extraction templates using weighted ranking score analysis to provide input data modifying, or adding to, the initial, or baseline, data extraction templates of the data management system, or application, associated with the system and method for managing user contributed data extraction templates using weighted ranking score analysis.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides data extraction template data representing either new data extraction template data or data extraction template data representing a modification to existing data extraction template data, and/or an existing data extraction template.

In one embodiment, a contributing user provides data extraction template data through a user interface provided by the data management system, and/or the process for managing user contributed data extraction templates using weighted ranking score analysis. In one embodiment, through the user interface, a contributing user marks areas and/or fields of the source document and identifies the data contained in those areas or fields, and/or modifies and/or adds data fields and/or areas to an existing, or initial, data extraction template. In one embodiment, when a contributing user marks areas/fields in a source document, or makes changes to an existing data extraction template, this data is used to generate data extraction template data that contains data indicating the location and contextual information of data in the source document of the specific source document type.

In one embodiment, once data extraction template data is received from baseline data, and/or one or more contributing users, the number of data fields within the specific type of source document that the data extraction template is known to be able to extract is determined and recorded; in one embodiment this is recorded as a field hit count number associated with the data extraction template represented by the data extraction template data. In various embodiments, the field hit count number associated with a data extraction template provides an initial indication of how much data can be obtained from a source document of the associated source document type using the data extraction template. Therefore, the field hit count number associated with a data extraction template is a measure of the usefulness of the data extraction template represented by the data extraction template data. In addition, the use of the field hit count number takes into consideration the fact that a contributing user providing the data extraction template data may not have contributed all required fields for creation of the data extraction template.

In one embodiment, data field ratio term data for the data extraction template is then generated for the data extraction template. In one embodiment, the data field ratio term data for the data extraction template is generated by dividing the field hit count number associated with the data extraction template by the required number of fields for the specific source document type.

In one embodiment, data field count weighting factor data is also generated and assigned to the data extraction template. In various embodiments, the data field count weighting factor assigned to the data extraction template is determined, generated, or chosen, based on one or more data field count weighting factor parameters.

In various embodiments, the data field count weighting factor parameters include, but are not limited to, a determination of the type of source document for which the data extraction template will eventually be used. As an example, in instances where it is desired to extract data from a large number of data fields, and perhaps some of the data fields contain redundant data, the data field count weighting factor may be made larger to account for the fact that there is significant need to obtain data from as many data fields as possible and some of this data can be cross-checked against redundant data fields.

In one embodiment, the data field count weighting factor parameters include, but are not limited to, a determination as to the age of the data extraction template, and/or the number of other data extraction templates associated with the specific type of source document. For instance, if the current data extraction template consists primarily of base data and little or no contributing user input data, and/or, if the current data extraction template is the only data extraction template, or the first data extraction template, being developed for the specific type of source document, then the data field count weighting factor may be made larger in order to emphasize the need to obtain any information and/or data regarding data fields associated with the specific type of source document.

In other embodiments, the data field count weighting factor parameters can include any parameters, and/or considerations, desirable, and/or as selected by the provider of the data management system for which the data extraction templates are being developed, the provider of the process for managing user contributed data extraction templates using weighted ranking score analysis, the user of the data management system, and/or any other interested parties, as discussed herein, and/or as known in the art at the time of filing, and/or as made known after the time of filing.

As discussed below, in various embodiments, when a new source document of the specific source document type is received, the appropriate data extraction template, or a set of data extraction templates, is/are chosen to be applied over the new source document.

In one embodiment, when data is extracted using a data extraction template, the count representing the number of times the data extraction template has been applied to source document is increased and the extracted data is presented to a user of the data extraction template for approval and/or acceptance. In one embodiment, the instances of acceptance or rejection of data extracted from a source document using the new or modified data extraction template is monitored and recorded.

In one embodiment, based on the acceptance or rejection data resulting from the monitoring of the acceptance or rejection of data extracted from source documents using the new or modified data extraction template, a data acceptance count to be associated with the data extraction template is determined. In one embodiment, when a data extraction template is created, i.e., when new data extraction template data is received, the data acceptance count associated with the new data extraction template is recorded as one, or some other defined initial value.

In one embodiment, each time the data extracted from a source document of the specific source document type using the new or modified data extraction template, or any data extraction template, is accepted by a user of the data extraction template, the data acceptance count associated with that data extraction template is increased; in one embodiment by one point for each instance where the extracted data is accepted. In one embodiment, if the data is not accepted by the user, then only the count depicting the number of times the data extraction template has been applied to source document is increased.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new field hit count number reflecting any added data fields that can be extracted using the new data extraction template and the user acceptance count associated with the new data extraction template is set to one, or another initial use value.

In one embodiment, data acceptance ratio term data for the data extraction template is then generated. In one embodiment, the data acceptance ratio term data for the data extraction template is generated by dividing the data acceptance count data associated with the data extraction template by the number of times the data extraction template has been applied to source documents of the source document type.

In one embodiment, data acceptance weighting factor data is then generated and assigned to the data extraction template. In various embodiments, the data acceptance weighting factor assigned to the data extraction template is determined, generated, or chosen, based on one or more data acceptance weighting factor parameters.

In various embodiments, the data acceptance weighting factor parameters include, but are not limited to, a determination of the type of source document for which the data extraction template will eventually be used. As an example, in instances where it is desired to extract data very accurately, or from a small number of data fields, the data acceptance weighting factor may be made larger to account for the fact that there is significant need to obtain as accurate data as possible.

In one embodiment, the data acceptance weighting factor parameters include, but are not limited to, a determination as to the age of the data extraction template, and/or the number of other data extraction templates associated with the specific type of source document. For instance, if the current data extraction template consists primarily of contributed user input data, and/or, if the current data extraction template is one of several data extraction templates associated with the specific type of source document, then the data acceptance weighting factor may be made larger in order to emphasize the need to obtain accurate data and the fact that data extraction templates for the specific type of source document already exist and only need modification.

In other embodiments, the data acceptance weighting factor parameters can include any parameters, and/or considerations, desirable, and/or as selected by the provider of the data management system for which the data extraction templates are being developed, the provider of the process for managing user contributed data extraction templates using weighted ranking score analysis, the user of the data management system, and/or any other interested parties, as discussed herein, and/or as known in the art at the time of filing, and/or as made known after the time of filing.

In one embodiment, the data field ratio term data for the data extraction template, the data field count weighting factor data assigned to the data extraction template, the data acceptance ratio term data for the data extraction template, and the data acceptance weighting factor data assigned to the data extraction template is then processed and transformed into data extraction template ranking score data for the data extraction template.

In one embodiment, the data field ratio term data for the data extraction template, the data field count weighting factor data assigned to the data extraction template, the data acceptance ratio term data for the data extraction template, and the data acceptance weighting factor data assigned to the data extraction template is transformed into data extraction template ranking score data for the data extraction template by multiplying the data field ratio term data for the data extraction template by the data field count weighting factor data assigned to the data extraction template to generate weighted data field ratio term data for the data extraction template.

In one embodiment, the data acceptance ratio term data for the data extraction template is multiplied by the data acceptance weighting factor data assigned to the data extraction template to generate weighted data acceptance ratio term data for the data extraction template.

In one embodiment, the weighted data field ratio term data for the data extraction template and the weighted data acceptance ratio term data for the data extraction template are added to generate data extraction template ranking score data for the data extraction template. Consequently, in one embodiment, the data extraction template ranking score data is calculated as follows:

$$\text{Ranking Score} = (WA*(\text{templateAcceptanceCount}/\text{templateRecommendationCount})) + (WC*(\text{fieldHitCount}/\#\text{ofFieldsRequired}))$$

Where:

templateAcceptanceCount=the data acceptance count associated with the data extraction template;

templateRecommendationCount=the number of times the template was used to extract data from a source document of the specific source document type;

fieldHitCount=the number of fields that can be extracted using the data extraction template;

ofFieldsRequired=the required number of fields data for the specific source document type;

templateAcceptanceCount/templateRecommendationCount=the data acceptance ratio term data for the data extraction template;

fieldHitCount/#ofFieldsRequired=data field ratio term data for the data extraction template;

WA=the data acceptance weighting factor data assigned to the data extraction template;

WC=the data field count weighting factor data assigned to the data extraction template;

WA*(templateAcceptanceCount/templateRecommendationCount=the weighted data acceptance ratio term data for the data extraction template; and WC*(fieldHitCount/#ofFieldsRequired=the weighted data field ratio term data for the data extraction template.

Given that the field hit count number associated with a given data extraction template is representative of the ability of the given data extraction template to extract the data from associated source document type, and that the acceptance count data associated with a given data extraction template is representative of the quality of data extraction performed by the given data extraction template, the ranking score data associated with a given data extraction template is a dynamic and weighted indication of how effective and accurate the given data extraction template is for extracting data from a specific type of source document.

In one embodiment, the data extraction template data and the data extraction template ranking score data for the data extraction template is then stored as ranked data extraction template data.

In one embodiment, ranked data extraction template data associated with two or more data extraction templates associated with the specific source document type are then aggregated and stored in a data extraction template database for use with new source documents of the specific source document type.

In one embodiment, when data extraction template data representing two or more data extraction templates associated with a given specific source document type is received, the ranking score data associated with data extraction templates is used to determine which of the data extraction templates is applied/used with new source documents of the specific document type, at least initially.

In one embodiment, when a new source document of a specific source document type is received, the data extraction template database is searched to identify the one or more data extraction templates categorized as being associated with the specific source document type of the new source document. In one embodiment, the new source document is matched recursively against the data extraction templates having the highest ranking scores until the number of data fields that can be extracted for the new source document match the field hit count for the data extraction template. In this way, when different variations of the same source document type are obtained and processed, the correct data extraction template for that variation of source document type can be identified by the fact that the data extraction template is able to extract every data field it is known to be able to extract. Typically, this situation would indicate that the correct data extraction template for the specific variation of the source document type has been found and applied.

In one embodiment, the extracted data is then presented to the data extraction template user for acceptance or rejection. In various embodiments, and in cases where multiple values for a particular field are detected, i.e., duplicate or redundant data is obtained, all such data are presented to the data extraction template user in a combo box or table. Then the data extraction template user is asked to select the correct data and when the data extraction template user selects the correct data, the data acceptance count for the data extraction template is increased, thereby also increasing the ranking score associated with the data extraction template.

Given that the data ranking score associated with a given data extraction template is increased each time the data acceptance count for the data extraction template is increased, and that the data field count number associated with a given data extraction template can also be increased by the modification mechanisms discussed above, the result of the application of the method and system for managing user contributed data extraction templates using weighted ranking score analysis is a dynamic and weighted ranking system of all the data extraction templates associated with a given source document type.

In one embodiment, as the ranking score associated with multiple data extraction templates associated with a specific source document type changes, the data extraction templates with the lowest data ranking scores are determined to no longer be relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

As one specific example, in one embodiment, a threshold data extraction template ranking score is established and any data extraction templates having a ranking score below the threshold data extraction template ranking score are dropped as new data extraction template data is received.

Using the system and method for managing user contributed data extraction templates using weighted ranking score analysis discussed herein, user-contribution is leveraged to not only create data extraction templates, but user contribution and usage is also used to rank and manage all data extraction templates associated with a specific source document type. As a result, using the system and method for managing user contributed data extraction templates using weighted ranking score analysis discussed herein, the efficiency of the data extraction template creation, application, and management is dynamic and constantly improving as more data management system users join the system and more and more data extraction template data is received.

In addition, using the system and method for managing user contributed data extraction templates using weighted ranking score analysis discussed herein, the data field count weighting factor data assigned to the data extraction template and the data acceptance weighting factor data assigned to the data extraction template can be used by various parties to emphasize different data extraction template capabilities for different types of source documents, and/or types of data extraction templates, thus providing a flexibility in application and implementation unknown with current template creation systems.

Hardware System Architecture

FIG. 1 is a block diagram of an exemplary hardware architecture for implementing one embodiment of a process for managing user contributed data extraction templates using weighted ranking score analysis, such as exemplary process 200 (FIG. 2) discussed herein.

FIG. 1 includes contributor systems 100A, 100B, through 100N, e.g., "N" representative computing systems associated with "N" contributing users who provide data extraction template data 115A, 115B, through 115N; process system 120, e.g., a computing system associated with a provider of a process for managing user contributed data extraction templates using weighted ranking score analysis; a data extraction template database 140, e.g., a database including data extraction template data; and communication channels 171, 172, 173, and 174.

As seen in FIG. 1, contributor systems 100A, 100B, through 100N include processor/Central Processing Units (CPUs) 101A, 101B, through 101N, memories 103A, 103B, through 103N, and communication interfaces 109A, 109B, through 109N.

In some embodiments, memories 103A, 103B, through 103N include all or part of data management system 105. In various embodiments, data management system 105 is any data management system as discussed herein, and/or as known/available in the art at the time of filing, and/or as developed/made available after the time of filing. In one embodiment, data management system 105 is a computing system implemented financial management system.

In some embodiments, memories 103A, 103B, through 103N include all, or part, of data extraction template data 115A, 115B, through 115N. As discussed below, the contributing individuals associated with contributor systems 100A, 100B, through 100N utilizing data management system 105 are provided the capability, and encouraged, to provide data extraction template data 115A, 115B, through 115N to data management system 105

In one embodiment, data extraction template data 115A, 115B, through 115N is then provided to process system 120 through data management system 105, communications interfaces 109A, 109B, through 109N, communications channels 171, 172, and 173, and communications interface 129.

Contributor systems 100A, 100B, through 100N, as shown in FIG. 1, are representative of any number "N" computing systems associated with one or more individuals. As discussed herein data extraction template data 115A, 115B, through 115N in FIG. 1, can be obtained from a single individual and/or a large number of individuals, even as many as thousands or hundreds of thousands or millions of individuals. Consequently, in various embodiments, contributor systems 100A, 100B, through 100N can be representative of hundreds of thousands, or even millions, of contributor systems and/or data extraction template data 115A, 115B, through 115N can be representative data extraction template data received from hundreds of thousands, or even millions, of individuals. Consequently, the three representative contributor systems 100A, 100B, through 100N are shown in FIG. 1 for illustrative purposes and are not limiting to the claims presented below.

In various embodiments, contributor systems 100A, 100B, through 100N can be any computing system discussed herein, and/or as known in the art at the time of filing, and/or as developed after the time of filing.

In various embodiments, contributor systems 100A, 100B, through 100N may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, contributor systems 100A, 100B, through 100N, whether available or known at the time of filing or as later developed.

Process system 120 can be any computing system as discussed herein, and/or as known in the art at the time of filing, and/or as developed thereafter, that includes components that can execute all, or part, of a process for managing user contributed data extraction templates using weighted ranking score analysis in accordance with at least one of the embodiments as described herein.

In one embodiment, process system 120 includes one or more Central Processing Units (CPUs) 121, memory 122, and communications interface 129.

In one embodiment, memory 122 includes all, or part, of data management system 105. In some embodiments, data management system 105 is any data management system as discussed herein, and/or as known/available in the art at the time of filing, and/or as developed/made available after the time of filing. In one embodiment, data management system 105 is a web-based, or server implemented financial management system.

In one embodiment, memory 122 includes all, or part, of data extraction template data 115A, 115B, through 115N received from contributor systems 100A, 100B, through 100N, and through data management system 105.

In one embodiment, memory 122 includes all, or part, of field hit count number determination module 123, which generates field hit count number data 124 for each of data extraction template data 115A, 115B, through 115N; data acceptance count determination module 125, which generates data acceptance count data 126 for each of data extraction template data 115A, 115B, through 115N; data field count weighting factor data 131 for each of data extraction template data 115A, 115B, through 115N; data acceptance weighting factor data 132 for each of data extraction template data 115A, 115B, through 115N; ranking score data determination module 127, which transforms field hit count number data 124, data field count weighting factor data 131, data acceptance count data 126, and data acceptance weighting factor data 132 for each of data extraction template data 115A, 115B, through 115N into ranking score data 128 for each of data extraction template data 115A, 115B, through 115N, and thereby generates ranked data extraction template data 130A, ranked data extraction template data 130B, through ranked data extraction template data 130N, associated with each of data extraction template data 115A, 115B, through 115N, respectively.

Process system 120 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

Data extraction template database 140 can be any database, or data store, as discussed herein, and/or as known in the art at the time of filing, and/or as developed thereafter, that includes components that can execute all, or part, of a process for managing user contributed data extraction templates using weighted ranking score analysis in accordance with at least one of the embodiments as described herein.

In one embodiment, data extraction template database 140 includes all, or part, of ranked data extraction template data 130A, ranked data extraction template data 130B, through ranked data extraction template data 130N, as received form process system 120 via communications interface 129 and communications channel 174.

In one embodiment, any, or all, of communications channels 171, 172, 173, and 174 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, contributor systems 100A, 100B, through 100N, provider system 120, and/or data extraction template database 140 are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, contributor systems 100A, 100B, through 100N, provider system 120, and/or data extraction template database 140 are not relevant.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a required number of data fields for which data is required to be extracted for a specific source document type and generating required number of fields data for the specific source document type. In one embodiment, data extraction template data representing a data extraction template associated with the specific source document type is then received, and/or generated.

In one embodiment, field hit count number data associated with the data extraction template indicating the number of data fields from which data can be extracted from the specific source document type using the data extraction template is determined. Data field ratio term data for the data extraction template is generated for the data extraction template and data field count weighting factor data is then generated and assigned to the data extraction template.

In one embodiment, data acceptance count data associated with the data extraction template indicating the number of times the data extracted from received source documents of the specific source document type using the data extraction template is accepted is determined. Data acceptance ratio term data for the data extraction template is then generated. In one embodiment data acceptance weighting factor data is then generated and assigned to the data extraction template.

In one embodiment, the data field ratio term data for the data extraction template, the data field count weighting factor data assigned to the data extraction template, the data acceptance ratio term data for the data extraction template, and the data acceptance weighting factor data assigned to the data extraction template is then processed and transformed into data extraction template ranking score data for the data extraction template. In one embodiment, the data extraction template data and the data extraction template ranking score data for the data extraction template is then stored as ranked data extraction template data.

In one embodiment, ranked data extraction template data associated with two or more data extraction templates associated with the specific source document type are then aggregated and stored for use with new source documents of the specific source document type.

Figure 2:
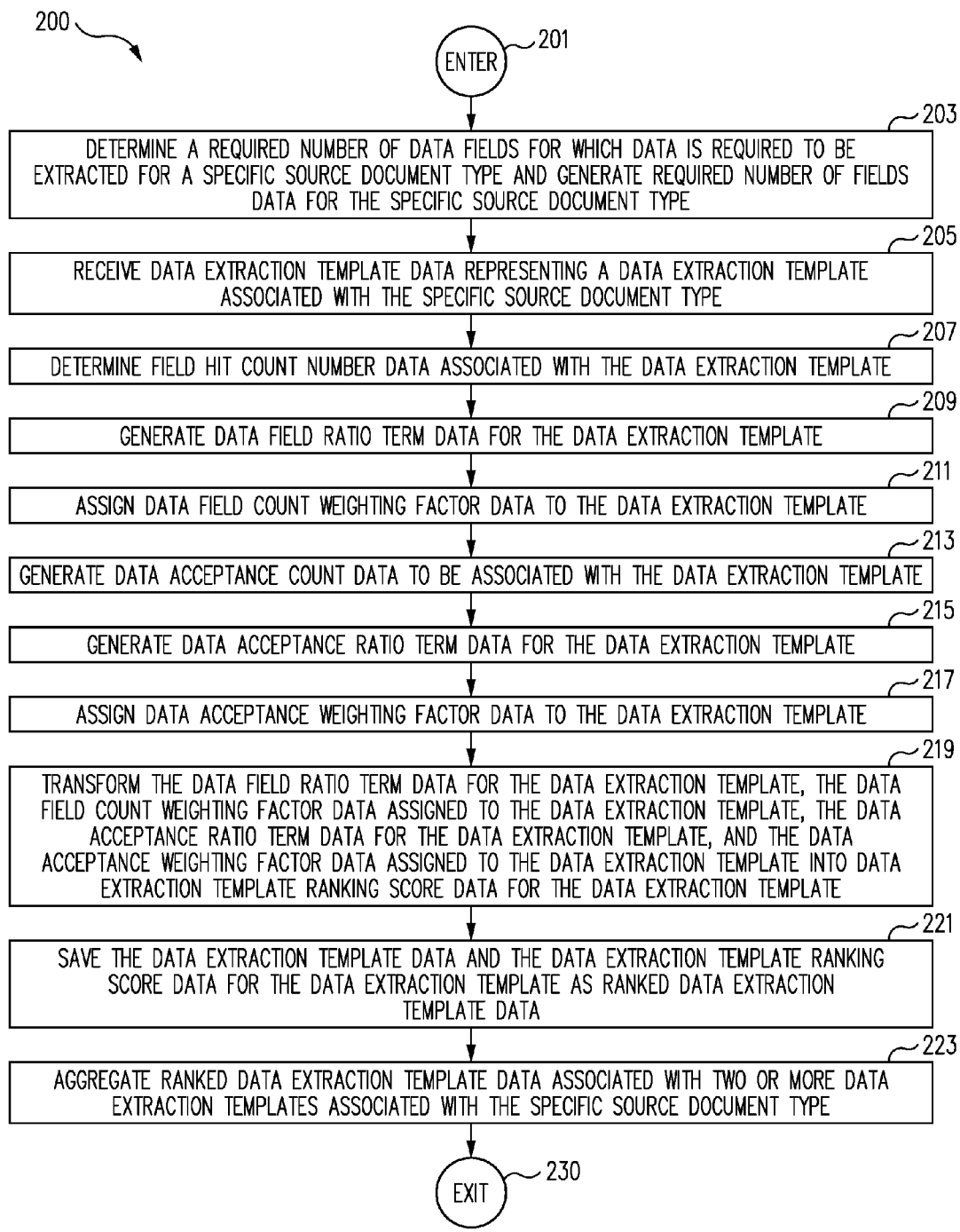
FIG. 2 is a flow chart depicting a process for managing user contributed data extraction templates using weighted ranking score analysis in accordance with one embodiment.

FIG. 2 is a flow chart depicting a process 200 for managing user contributed data extraction templates using weighted ranking score analysis in accordance with one embodiment. In one embodiment, process 200 for managing user contributed data extraction templates using weighted ranking score analysis begins at ENTER OPERATION 201 and process flow proceeds to DETERMINE A REQUIRED NUMBER OF DATA FIELDS FOR WHICH DATA IS REQUIRED TO BE EXTRACTED FOR A SPECIFIC SOURCE DOCUMENT TYPE AND GENERATE REQUIRED NUMBER OF FIELDS DATA FOR THE SPECIFIC SOURCE DOCUMENT TYPE OPERATION 203.

In accordance with one embodiment, process 200 for managing user contributed data extraction templates using weighted ranking score analysis is part of, linked to, or otherwise associated with, one or more data and/or financial management systems used by one or more individuals/users.

In one embodiment, individuals employing a data management system, such as, but not limited to, a financial management system, are provided the capability to create and/or modify data extraction templates used to extract data from specific types of source documents. In one embodiment, individual/user contribution for creating data extraction templates for use in extracting data from new/unknown source document types, or to extract new data from known source document types, is solicited by a provider of a data management system associated with process 200 for managing user contributed data extraction templates using weighted ranking score analysis.

In various embodiments, the specific types of source documents include, but are not limited to, invoices, bills, and/or account statements from specific parties and/or financial institutions; various tax forms, and/or tax related documents, related to federal, state, and/or local taxes; various healthcare related documents and forms associated with specific healthcare service providers and/or healthcare insurance providers; various income and/or expense statements associated with specific employers and/or financial institutions; and/or any other source documents as discussed herein, and/or as known in the art at the time of filing, and/or as developed/made available after the time of filing that include data that is to be extracted using a data extraction template for use by a data management system.

In one embodiment, it is assumed that the data management system, or other application, that needs data from source documents includes data indicating the type of data required, e.g., the data fields required. For example, it is assumed a small business financial management system's import invoice feature includes data indicating that fields containing due date data, amount due data, etc., need to have this data extracted.

In one embodiment, at DETERMINE A REQUIRED NUMBER OF DATA FIELDS FOR WHICH DATA IS REQUIRED TO BE EXTRACTED FOR A SPECIFIC SOURCE DOCUMENT TYPE AND GENERATE REQUIRED NUMBER OF FIELDS DATA FOR THE SPECIFIC SOURCE DOCUMENT TYPE OPERATION 203 the data fields/data required by the data management system, or other application, is used to determine a required number of data fields for which data is required to be extracted for a specific source document type and to generate required number of fields data for the specific source document type.

In one embodiment, once the data fields/data required by the data management system, or other application, is used to determine a required number of data fields for which data is required to be extracted for a specific source document type and to generate required number of fields data for the specific source document type at DETERMINE A REQUIRED NUMBER OF DATA FIELDS FOR WHICH DATA IS REQUIRED TO BE EXTRACTED FOR A SPECIFIC SOURCE DOCUMENT TYPE AND GENERATE REQUIRED NUMBER OF FIELDS DATA FOR THE SPECIFIC SOURCE DOCUMENT TYPE OPERATION 203, process flow proceeds to RECEIVE DATA EXTRACTION TEMPLATE DATA REPRESENTING A DATA EXTRAC-

TION TEMPLATE ASSOCIATED WITH THE SPECIFIC SOURCE DOCUMENT TYPE OPERATION 205.

In one embodiment, at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 baseline data associated with the extraction of data from specific types of source documents is provided and used to create initial, or baseline, data extraction templates.

In one embodiment, at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 the initial, or baseline, data extraction templates are used to encourage/entice users of a data management system, or application, associated with the process 200 for managing user contributed data extraction templates using weighted ranking score analysis to provide input data modifying, or adding to, the initial, or baseline, data extraction templates of the data management system, or application, associated with process 200 for managing user contributed data extraction templates using weighted ranking score analysis.

In one embodiment, at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 a contributing user provides data extraction template data through a user interface provided by the data management system, and/or process 200 for managing user contributed data extraction templates using weighted ranking score analysis.

In one embodiment, at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205, through the user interface, a contributing user marks areas and/or fields of the source document and identifies the data contained in those areas or fields, and/or modifies and/or adds data fields and/or areas to an existing, or initial, data extraction template. In one embodiment, when a contributing user marks areas/fields in a source document, or makes changes to an existing data extraction template, this data is used at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 to generate data extraction template data that contains data indicating the location and contextual information of data in the source document of the specific source document type.

In one embodiment, once baseline data associated with the extraction of data from specific types of source documents is provided and used to create initial, or baseline, data extraction templates at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205, process flow proceeds to DETERMINE FIELD HIT COUNT NUMBER DATA ASSOCIATED WITH THE DATA EXTRACTION TEMPLATE OPERATION 207.

In one embodiment, once data extraction template data is received from one or more contributing users at RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205, the number of data fields within the specific type of source document that the data extraction template is known to extract is determined and recorded, in one embodiment this is recorded as a field hit count number associated with the data extraction template represented by the data extraction template data, at DETERMINE FIELD HIT COUNT NUMBER DATA ASSOCIATED WITH THE DATA EXTRACTION TEMPLATE OPERATION 207.

In various embodiments, the field hit count number associated with a data extraction template of DETERMINE FIELD HIT COUNT NUMBER DATA ASSOCIATED WITH THE DATA EXTRACTION TEMPLATE OPERATION 207 provides an initial indication of how much of the required data can be obtained from a source document of the associated source document type using the data extraction template. Therefore, the field hit count number associated with a data extraction template of DETERMINE FIELD HIT COUNT NUMBER DATA ASSOCIATED WITH THE DATA EXTRACTION TEMPLATE OPERATION 207 is a measure of the usefulness of the data extraction template represented by the data extraction template data. In addition, the use of the field hit count number at DETERMINE FIELD HIT COUNT NUMBER DATA ASSOCIATED WITH THE DATA EXTRACTION TEMPLATE OPERATION 207 takes into consideration the fact that a contributing user providing the data extraction template data may not have contributed all required fields for creation of the data extraction template.

As discussed below, in one embodiment, once created, the data extraction templates represented by the data extraction template data of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 are categorized according to the specific document type associated with the data extraction templates, and for which the data extraction templates are to be used to extract data from source documents of the specific source document type. In one embodiment, the data extraction templates associated with a specific source document type, and data representing the field hit count number of DETERMINE FIELD HIT COUNT NUMBER DATA ASSOCIATED WITH THE DATA EXTRACTION TEMPLATE OPERATION 207, are then aggregated and stored in a data extraction template database according to the category assigned to the data extraction templates, e.g., according to the source document type associated with the data extraction templates.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, once the number of data fields within the specific type of source document that the data extraction template is known to extract is determined and recorded, in one embodiment this is recorded as a field hit count number associated with the data extraction template represented by the data extraction template data, at DETERMINE FIELD HIT COUNT NUMBER DATA ASSOCIATED WITH THE DATA EXTRACTION TEMPLATE OPERATION 207, process flow proceeds to GENERATE DATA FIELD RATIO TERM DATA FOR THE DATA EXTRACTION TEMPLATE OPERATION 209.

In one embodiment, at GENERATE DATA FIELD RATIO TERM DATA FOR THE DATA EXTRACTION TEMPLATE OPERATION 209 data field ratio term data for the data extraction template is generated for the data extraction template.

In one embodiment, the data field ratio term data for the data extraction template is generated at GENERATE DATA FIELD RATIO TERM DATA FOR THE DATA EXTRACTION TEMPLATE OPERATION 209 by dividing the field hit count number associated with the data extraction template of DETERMINE FIELD HIT COUNT NUMBER DATA ASSOCIATED WITH THE DATA EXTRACTION TEMPLATE OPERATION 207 by the required number of fields for the specific source document type of DETERMINE A REQUIRED NUMBER OF DATA FIELDS FOR WHICH DATA IS REQUIRED TO BE EXTRACTED FOR A SPECIFIC SOURCE DOCUMENT TYPE AND GENERATE REQUIRED NUMBER OF FIELDS DATA FOR THE SPECIFIC SOURCE DOCUMENT TYPE OPERATION 203.

In one embodiment, once data field ratio term data for the data extraction template is generated for the data extraction template at GENERATE DATA FIELD RATIO TERM DATA FOR THE DATA EXTRACTION TEMPLATE OPERATION 209, process flow proceeds to ASSIGN DATA FIELD COUNT WEIGHTING FACTOR DATA TO THE DATA EXTRACTION TEMPLATE OPERATION 211.

In one embodiment, at ASSIGN DATA FIELD COUNT WEIGHTING FACTOR DATA TO THE DATA EXTRACTION TEMPLATE OPERATION 211 data field count weighting factor data is generated and assigned to the data extraction template of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205.

In various embodiments, the data field count weighting factor assigned to the data extraction template is determined, generated, or chosen, at ASSIGN DATA FIELD COUNT WEIGHTING FACTOR DATA TO THE DATA EXTRACTION TEMPLATE OPERATION 211 based on one or more data field count weighting factor parameters.

In various embodiments, the data field count weighting factor parameters of ASSIGN DATA FIELD COUNT WEIGHTING FACTOR DATA TO THE DATA EXTRACTION TEMPLATE OPERATION 211 include, but are not limited to, a determination of the type of source document for which the data extraction template will eventually be used.

As an example, in instances where it is desired to extract data from a large number of data fields, and perhaps some of the data fields contain redundant data, at ASSIGN DATA FIELD COUNT WEIGHTING FACTOR DATA TO THE DATA EXTRACTION TEMPLATE OPERATION 211 the data field count weighting factor may be made larger to account for the fact that there is significant need to obtain data from as many data fields as possible and some of this data can be cross-checked against redundant data fields.

In one embodiment, the data field count weighting factor parameters of at ASSIGN DATA FIELD COUNT WEIGHTING FACTOR DATA TO THE DATA EXTRACTION TEMPLATE OPERATION 211 include, but are not limited to, a determination as to the age of the data extraction template, and/or the number of other data extraction templates associated with the specific type of source document.

For instance, if the current data extraction template consists primarily of base data and little or no contributing user input data, and/or, if the current data extraction template is the only data extraction template, or the first data extraction template, being developed for the specific type of source document, then at ASSIGN DATA FIELD COUNT WEIGHTING FACTOR DATA TO THE DATA EXTRACTION TEMPLATE OPERATION 211 the data field count weighting factor may be made larger in order to emphasize the need to obtain any information and/or data regarding data fields associated with the specific type of source document.

In other embodiments, the data field count weighting factor parameters of at ASSIGN DATA FIELD COUNT WEIGHTING FACTOR DATA TO THE DATA EXTRACTION TEMPLATE OPERATION 211 can include any parameters, and/or considerations, desirable, and/or as selected by the provider of the data management system for which the data extraction templates are being developed, the provider of process 200 for managing user contributed data extraction templates using weighted ranking score analysis, the user of the data management system, and/or any other interested parties, as discussed herein, and/or as known in the art at the time of filing, and/or as made known after the time of filing.

In one embodiment, once data field count weighting factor data is generated and assigned to the data extraction template at ASSIGN DATA FIELD COUNT WEIGHTING FACTOR DATA TO THE DATA EXTRACTION TEMPLATE OPERATION 211, process flow proceeds to GENERATE DATA ACCEPTANCE COUNT DATA TO BE ASSOCIATED WITH THE DATA EXTRACTION TEMPLATE OPERATION 213.

In various embodiments, when a new source document of the specific source document type associated with the data extraction template of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 is received, the data extraction template of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 is applied to the new source document, i.e., data is extracted from the new source document using the new or modified data extraction template.

In one embodiment, when data is extracted using the data extraction template, the extracted data is presented to a user of the data extraction template for approval and/or acceptance. In one embodiment, at GENERATE DATA ACCEPTANCE COUNT DATA TO BE ASSOCIATED WITH THE DATA EXTRACTION TEMPLATE OPERATION 213 the instances of acceptance or rejection of data extracted from a source document using the new or modified data extraction template is monitored and recorded.

In one embodiment, based on the acceptance or rejection data resulting from the monitoring of the acceptance or rejection of data extracted from source documents using the new or modified data extraction template, a data acceptance count to be associated with the data extraction template is determined at GENERATE DATA ACCEPTANCE COUNT DATA TO BE ASSOCIATED WITH THE DATA EXTRACTION TEMPLATE OPERATION 213.

In one embodiment, when a data extraction template is created, i.e., when new data extraction template data is received, the data acceptance count associated with the new data extraction template is recorded GENERATE DATA ACCEPTANCE COUNT DATA TO BE ASSOCIATED WITH THE DATA EXTRACTION TEMPLATE OPERATION 213 as one, or some other defined initial value.

In one embodiment, each time the data extracted from a source document of the specific source document type using the new or modified data extraction template, or any data extraction template, is accepted by a user of the data extraction template, the data acceptance count associated with that data extraction template is increased at GENERATE DATA ACCEPTANCE COUNT DATA TO BE ASSOCIATED WITH THE DATA EXTRACTION TEMPLATE OPERATION 213; in one embodiment by one point for each instance where the extracted data is accepted. In one embodiment, if the data is not accepted by the user, then only the count depicting the number of times the data extraction template has been applied to source document is increased.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new field hit count number reflecting any added data fields that can be extracted using the new data extraction template and the user acceptance count associated with the new data extraction template is set to one, or another initial use value.

In one embodiment, once a data acceptance count to be associated with the data extraction template is determined at GENERATE DATA ACCEPTANCE COUNT DATA TO BE ASSOCIATED WITH THE DATA EXTRACTION TEMPLATE OPERATION 213, process flow proceeds to GENERATE DATA ACCEPTANCE RATIO TERM DATA FOR THE DATA EXTRACTION TEMPLATE OPERATION 215.

In one embodiment, at GENERATE DATA ACCEPTANCE RATIO TERM DATA FOR THE DATA EXTRACTION TEMPLATE OPERATION 215 data acceptance ratio term data for the data extraction template is generated.

In one embodiment, the data acceptance ratio term data for the data extraction template is generated at GENERATE DATA ACCEPTANCE RATIO TERM DATA FOR THE DATA EXTRACTION TEMPLATE OPERATION 215 by dividing the data acceptance count data associated with the data extraction template of GENERATE DATA ACCEPTANCE COUNT DATA TO BE ASSOCIATED WITH THE DATA EXTRACTION TEMPLATE OPERATION 213 by the number of times the data extraction template has been applied to source documents of the source document type.

In one embodiment, once data acceptance ratio term data for the data extraction template is generated at GENERATE DATA ACCEPTANCE RATIO TERM DATA FOR THE DATA EXTRACTION TEMPLATE OPERATION 215, process flow proceeds to ASSIGN DATA ACCEPTANCE WEIGHTING FACTOR DATA TO THE DATA EXTRACTION TEMPLATE OPERATION 217.

In one embodiment, at ASSIGN DATA ACCEPTANCE WEIGHTING FACTOR DATA TO THE DATA EXTRACTION TEMPLATE OPERATION 217 data acceptance weighting factor data is generated and assigned to the data extraction template of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205.

In various embodiments, the data acceptance weighting factor assigned to the data extraction template is determined, generated, or chosen, at ASSIGN DATA ACCEPTANCE WEIGHTING FACTOR DATA TO THE DATA EXTRACTION TEMPLATE OPERATION 217 based on one or more data acceptance weighting factor parameters.

In various embodiments, the data acceptance weighting factor parameters of ASSIGN DATA ACCEPTANCE WEIGHTING FACTOR DATA TO THE DATA EXTRACTION TEMPLATE OPERATION 217 include, but are not limited to, a determination of the type of source document for which the data extraction template will eventually be used.

As an example, in instances where it is desired to extract data very accurately, or from a small number of data fields, the data acceptance weighting factor may be made larger at ASSIGN DATA ACCEPTANCE WEIGHTING FACTOR DATA TO THE DATA EXTRACTION TEMPLATE OPERATION 217 to account for the fact that there is significant need to obtain as accurate data as possible.

In one embodiment, the data acceptance weighting factor parameters of ASSIGN DATA ACCEPTANCE WEIGHTING FACTOR DATA TO THE DATA EXTRACTION TEMPLATE OPERATION 217 include, but are not limited to, a determination as to the age of the data extraction template, and/or the number of other data extraction templates associated with the specific type of source document.

For instance, if the current data extraction template consists primarily of contributed user input data, and/or, if the current data extraction template is one of several data extraction templates associated with the specific type of source document, then the data acceptance weighting factor may be made larger at ASSIGN DATA ACCEPTANCE WEIGHTING FACTOR DATA TO THE DATA EXTRACTION TEMPLATE OPERATION 217 in order to emphasize the need to obtain accurate data and the fact that data extraction templates for the specific type of source document already exist and only need modification.

In other embodiments, the data acceptance weighting factor parameters of ASSIGN DATA ACCEPTANCE WEIGHTING FACTOR DATA TO THE DATA EXTRACTION TEMPLATE OPERATION 217 can include any parameters, and/or considerations, desirable, and/or as selected by the provider of the data management system for which the data extraction templates are being developed, the provider of process 200 for managing user contributed data extraction templates using weighted ranking score analysis, the user of the data management system, and/or any other interested parties, as discussed herein, and/or as known in the art at the time of filing, and/or as made known after the time of filing.

In one embodiment, once data acceptance weighting factor data is generated and assigned to the data extraction template at ASSIGN DATA ACCEPTANCE WEIGHTING FACTOR DATA TO THE DATA EXTRACTION TEMPLATE OPERATION 217, process flow proceeds to TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219.

In one embodiment, at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 the data field ratio term data for the data extraction template of GENERATE DATA FIELD RATIO TERM DATA FOR THE DATA EXTRACTION TEMPLATE OPERATION 209, the data field count weighting factor data assigned to the data extraction template of ASSIGN DATA FIELD COUNT WEIGHTING FACTOR DATA TO THE DATA EXTRACTION TEMPLATE OPERATION 211, the data acceptance ratio term data for the data extraction template of GENERATE DATA ACCEPTANCE RATIO TERM DATA FOR THE DATA EXTRACTION TEMPLATE OPERATION 215, and the data acceptance weighting factor data assigned to the data extraction template of ASSIGN DATA ACCEPTANCE WEIGHTING FACTOR DATA TO THE DATA EXTRACTION TEMPLATE OPERATION 217 is processed and transformed into data extraction template ranking score data for the data extraction template.

In one embodiment, at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 the data field ratio term data for the data extraction template, the data field count weighting factor data assigned to the data extraction template, the data acceptance ratio term data for the data extraction template, and the data acceptance weighting factor data assigned to the data extraction template is transformed into data extraction template ranking score data for the data extraction template by multiplying the data field ratio term data for the data extraction template by the data field count weighting factor data assigned to the data extraction template to generate weighted data field ratio term data for the data extraction template.

In one embodiment, at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 the data acceptance ratio term data for the data extraction template is multiplied by the data acceptance weighting factor data assigned to the data extraction template to generate weighted data acceptance ratio term data for the data extraction template.

In one embodiment, at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 the weighted data field ratio term data for the data extraction template and the weighted data acceptance ratio term data for the data extraction template are added to generate data extraction template ranking score data for the data extraction template.

Consequently, in one embodiment, the data extraction template ranking score data is calculated at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 as follows:

$$\text{Ranking Score} = (WA*(\text{templateAcceptanceCount}/\text{templateRecommendationCount})) + (WC*(\text{fieldHitCount}/\text{\#ofFieldsRequired})$$

Where:

templateAcceptanceCount=the data acceptance count associated with the data extraction template of GENERATE DATA ACCEPTANCE COUNT DATA TO BE ASSOCIATED WITH THE DATA EXTRACTION TEMPLATE OPERATION 213;

templateRecommendationCount=the number of times the template was used to extract data from a source document of the specific source document type;

fieldHitCount=the number of fields that can be extracted using the data extraction template of DETERMINE FIELD HIT COUNT NUMBER DATA ASSOCIATED WITH THE DATA EXTRACTION TEMPLATE OPERATION 207;

ofFieldsRequired=the required number of fields data for the specific source document type of DETERMINE A REQUIRED NUMBER OF DATA FIELDS FOR WHICH DATA IS REQUIRED TO BE EXTRACTED FOR A SPECIFIC SOURCE DOCUMENT TYPE AND GENERATE REQUIRED NUMBER OF FIELDS DATA FOR THE SPECIFIC SOURCE DOCUMENT TYPE OPERATION 203;

templateAcceptanceCount/templateRecommendationCount=the data acceptance ratio term data for the data extraction template of GENERATE DATA ACCEPTANCE RATIO TERM DATA FOR THE DATA EXTRACTION TEMPLATE OPERATION 215;

fieldHitCount/#ofFieldsRequired=data field ratio term data for the data extraction template of GENERATE DATA FIELD RATIO TERM DATA FOR THE DATA EXTRACTION TEMPLATE OPERATION 209;

WA=the data acceptance weighting factor data assigned to the data extraction template of ASSIGN DATA ACCEPTANCE WEIGHTING FACTOR DATA TO THE DATA EXTRACTION TEMPLATE OPERATION 217;

WC=the data field count weighting factor data assigned to the data extraction template of ASSIGN DATA FIELD COUNT WEIGHTING FACTOR DATA TO THE DATA EXTRACTION TEMPLATE OPERATION 211;

WA*(templateAcceptanceCount/templateRecommendationCount=the weighted data acceptance ratio term data for the data extraction template; and WC*(fieldHitCount/#ofFieldsRequired=the weighted data field ratio term data for the data extraction template.

Given that the field hit count number associated with a given data extraction template is representative of the ability of the given data extraction template to extract the data from associated source document type, and that the acceptance count data associated with a given data extraction template is representative of the quality of data extraction performed by the given data extraction template, the ranking score data associated with a given data extraction template of TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 is a dynamic and weighted indication of how effective and accurate the given data extraction template is for extracting data from a specific type of source document.

In one embodiment, once the data field ratio term data for the data extraction template, the data field count weighting factor data assigned to the data extraction template, the data acceptance ratio term data for the data extraction template, and the data acceptance weighting factor data assigned to the data extraction template is processed and transformed into data extraction template ranking score data for the data extraction template at TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219, process flow proceeds to SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221.

In one embodiment, at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221 the data extraction template data of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 and the data extraction template ranking score data for the data extraction template of TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 are correlated and stored as ranked data extraction template data.

In one embodiment, once the data extraction template data of RECEIVE DATA EXTRACTION TEMPLATE DATA REPRESENTING A DATA EXTRACTION TEMPLATE ASSOCIATED WITH THE SPECIFIC SOURCE DOCUMENT TYPE OPERATION 205 and the data extraction template ranking score data for the data extraction template of TRANSFORM THE DATA FIELD RATIO TERM DATA FOR THE DATA EXTRACTION TEMPLATE, THE DATA FIELD COUNT WEIGHTING FACTOR DATA ASSIGNED TO THE DATA EXTRACTION TEMPLATE, THE DATA ACCEPTANCE RATIO TERM DATA FOR THE DATA EXTRACTION TEMPLATE, AND THE DATA ACCEPTANCE WEIGHTING FACTOR DATA ASSIGNED TO THE DATA EXTRACTION TEMPLATE INTO DATA EXTRACTION TEMPLATE RANKING SCORE DATA FOR THE DATA EXTRACTION TEMPLATE OPERATION 219 are correlated and stored as ranked data extraction template data at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221, process flow proceeds to AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223 ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221 associated with two or more data extraction templates associated with the specific source document type are aggregated and stored.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223 ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221 associated with two or more data extraction templates associated with the specific source document type are categorized according to the specific document type associated with the data extraction templates, and for which the data extraction templates are to be used to extract data from source documents of the specific source document type.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223 the ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 221 associated with two or more data extraction templates associated with the specific source document type are then aggregated and stored in a data extraction template database according to the category assigned to the data extraction templates, e.g., according to the source document type associated with the data extraction templates.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223 when data extraction template data representing two or more data extraction templates associated with a given specific source document type is received, the ranking score data associated with data extraction templates is used to determine which of the data extraction templates is applied/used with new source documents of the specific document type, at least initially.

In one embodiment, when a new source document of a specific source document type is received, the data extraction template database is searched to identify the one or more data extraction templates categorized as being associated with the specific source document type of the new source document. In one embodiment, the new source document is matched recursively against the data extraction templates having the highest ranking scores until the number of data fields that can be extracted for the new source document match the field hit count for the data extraction template.

In this way, when different variations of the same source document type are obtained and processed, the correct data extraction template for that variation of source document type can be identified by the fact that the data extraction template is able to extract every data field it is known to be able to extract. Typically, this situation would indicate that the correct data extraction template for the specific variation of the source document type has been found and applied.

In one embodiment, the extracted data is then presented to the data extraction template user for acceptance or rejection. In various embodiments, and in cases where multiple values for a particular field are detected, i.e., duplicate or redundant data is obtained, all such data are presented to the data extraction template user in a combo box or table. Then the data extraction template user is asked to select the correct data and when the data extraction template user selects the correct data, the data acceptance count for the data extraction template is increased, thereby also increasing the ranking score associated with the data extraction template.

Given that the data ranking score associated with a given data extraction template is increased each time the data acceptance count for the data extraction template is increased, and that the data field count number associated with a given data extraction template can also be increased by the modification mechanisms discussed above, the result of the application of process 200 for managing user contributed data extraction templates using weighted ranking score analysis is a dynamic and weighted ranking system of all the data extraction templates associated with a given source document type.

In one embodiment, as the ranking score associated with multiple data extraction templates associated with a specific source document type changes, the data extraction templates with the lowest data ranking scores are determined to no longer be relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

As one specific example, in one embodiment, a threshold data extraction template ranking score is established and any data extraction templates having a ranking score below the threshold data extraction template ranking score are dropped as new data extraction template data is received.

In one embodiment, once ranked data extraction template data associated with two or more data extraction templates associated with the specific source document type are aggregated and stored at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 223, process flow proceeds to EXIT OPERATION 230.

In one embodiment, at EXIT OPERATION 230, process 200 for managing user contributed data extraction templates using weighted ranking score analysis is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 200 for managing user contributed data extraction templates using weighted ranking score analysis discussed above, user-contribution is leveraged to not only create data extraction templates, but user contribution and usage is also used to rank and manage all data extraction templates associated with a specific source document type. As a result, using process 200 for managing user contributed data extraction templates using weighted ranking score analysis discussed above, the efficiency of the data extraction template creation, application, and management is dynamic and constantly improving as more data management system users join the system and more and more data extraction template data is received.

In addition, using process 200 for managing user contributed data extraction templates using weighted ranking score analysis discussed above, the data field count weighting factor data assigned to the data extraction template and the data acceptance weighting factor data assigned to the data extraction template can be used by various parties to emphasize different data extraction template capabilities for different types of source documents, and/or types of data extraction templates thus providing a flexibility in application and implementation unknown with current template creation systems.

In some cases, user acceptance of the data extracted is considered the most important consideration. In these cases, the data acceptance count associated with a data extraction template is used by a process for managing user contributed data extraction templates using user acceptance data and ranking scores that generates a feedback loop through which the data extraction templates are continuously and dynamically improved to meet new environments, new documents, and new user needs.

Figure 3:
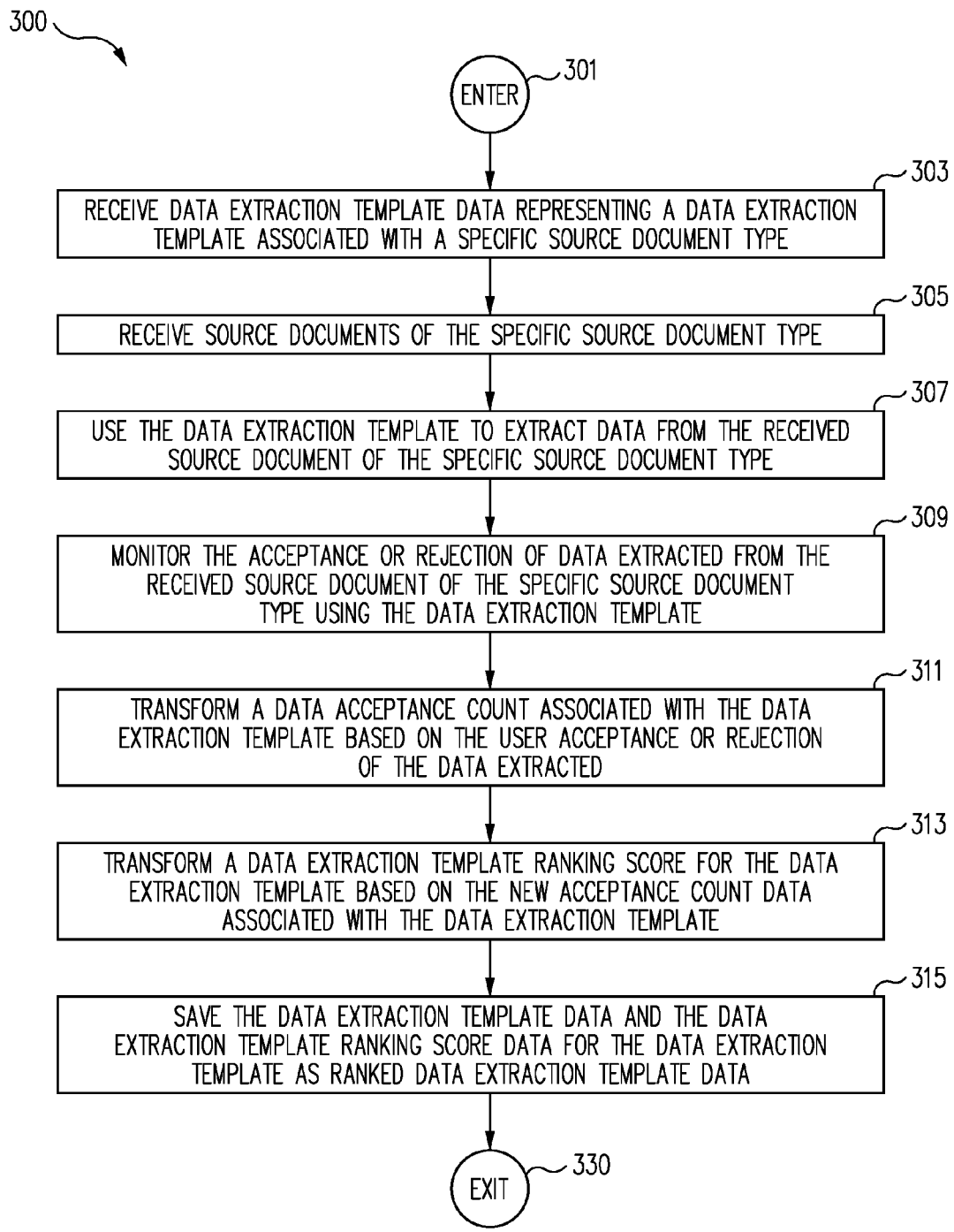
FIG. 3 is a flow chart depicting a process for managing user contributed data extraction templates using user acceptance data and ranking scores in accordance with one embodiment.

FIG. 3 is a flow chart depicting a process 300 for managing user contributed data extraction templates using user acceptance data and ranking scores in accordance with one embodiment. In one embodiment, process 300 for managing user contributed data extraction templates using user acceptance data and ranking scores begins at ENTER OPERATION 301 and process flow proceeds to RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303.

In one embodiment, at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 data representing a data extraction template associated with a specific source document type is provided and/or received.

In one embodiment, the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 is an initial, or baseline, data extraction template, such as those discussed above, that are intended to be modified by a contributing user, i.e., a user of the data management system who is providing, or modifying, data extraction templates, of a data management system associated with process 300 for managing user contributed data extraction templates using user acceptance data and ranking scores.

In one embodiment, the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 is an existing data extraction template that may have already been modified one or more times by a user of the data management system who is providing, or modifying, data extraction templates.

In one embodiment, the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 is associated with, and categorized according to, a specific document type for which the data extraction template is to be used to extract data.

In one embodiment, once data representing a data extraction template associated with a specific source document type is provided and/or received at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303, process flow proceeds to RECEIVE SOURCE DOCUMENTS OF THE SPECIFIC SOURCE DOCUMENT TYPE OPERATION 305.

In one embodiment, at RECEIVE SOURCE DOCUMENTS OF THE SPECIFIC SOURCE DOCUMENT TYPE OPERATION 305 a new source document of the specific source document type associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 is received.

In one embodiment, at RECEIVE SOURCE DOCUMENTS OF THE SPECIFIC SOURCE DOCUMENT TYPE OPERATION 305 when a new source document of the specific source document type is received, it is identified as a source document of the specific source document type and therefore matched with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303.

In one embodiment, once a new source document of the specific source document type associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 is received at RECEIVE SOURCE DOCUMENTS OF THE SPECIFIC SOURCE DOCUMENT TYPE OPERATION 305, process flow proceeds to USE THE DATA EXTRACTION TEMPLATE TO EXTRACT DATA FROM THE RECEIVED SOURCE DOCUMENT OF THE SPECIFIC SOURCE DOCUMENT TYPE OPERATION 307.

In one embodiment, at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307 the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 matched to the new source document of RECEIVE SOURCE DOCUMENTS OF THE SPECIFIC SOURCE DOCUMENT TYPE OPERATION 305 is applied to the new source document, i.e., data is extracted from the new source document using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303.

In one embodiment, once the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 matched to the new source document of RECEIVE SOURCE DOCUMENTS OF THE SPECIFIC SOURCE DOCUMENT TYPE OPERATION 305 is applied to the new source document, i.e., data is extracted from the new source document using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303, at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307, process flow proceeds to MONITOR THE ACCEPTANCE OR REJECTION OF DATA EXTRACTED FROM THE RECEIVED SOURCE DOCUMENT OF THE SPECIFIC SOURCE DOCUMENT TYPE USING THE DATA EXTRACTION TEMPLATE OPERATION 309.

In one embodiment, when data is extracted using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307, the extracted data is presented to a user of the data extraction template for approval and/or acceptance.

In one embodiment, at MONITOR THE ACCEPTANCE OR REJECTION OF DATA EXTRACTED FROM THE RECEIVED SOURCE DOCUMENT OF THE SPECIFIC SOURCE DOCUMENT TYPE USING THE DATA EXTRACTION TEMPLATE OPERATION 309 the acceptance or rejection of data extracted using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307 is monitored and recorded.

In one embodiment, once the acceptance or rejection of data extracted using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307 is monitored and recorded at MONITOR THE ACCEPTANCE OR REJECTION OF DATA EXTRACTED FROM THE RECEIVED SOURCE DOCUMENT OF THE SPECIFIC SOURCE DOCUMENT TYPE USING THE DATA EXTRACTION TEMPLATE OPERATION 309, process flow proceeds to TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311.

In one embodiment, at TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311, based on the acceptance or rejection data resulting from the monitoring of the acceptance or rejection of data extracted from source documents using the data extraction template of MONITOR THE ACCEPTANCE OR REJECTION OF DATA EXTRACTED FROM THE RECEIVED SOURCE DOCUMENT OF THE SPECIFIC SOURCE DOCUMENT TYPE USING THE DATA EXTRACTION TEMPLATE OPERATION 309, a data acceptance count associated with the data extraction template is transformed.

In one embodiment, when a data extraction template is created, i.e., when new data extraction template data is received, the data acceptance count associated with the new data extraction template is recorded as one, or some other defined initial value.

In one embodiment, each time the entirety of the data extracted from a source document of the specific source document type using the data extraction template is accepted by a user of the data extraction template, the data acceptance count associated with that data extraction template is increased at TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311; in one embodiment by one point for each instance where the extracted data is accepted.

In one embodiment, if the entirety of the data extracted from a source document of the specific source document type using the data extraction template is not accepted by the user, then only the count depicting the number of times the data extraction template has been applied to source document is increased.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new user acceptance count associated with the new data extraction template of one, or another initial use value, at TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311.

In one embodiment, once the data acceptance count associated with the data extraction template is transformed at TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311 to create a new data acceptance count, process flow proceeds to TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313.

In one embodiment, at TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313 data representing the transformed acceptance count data of TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303, i.e., the new data acceptance count data of TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311, is processed to transform the ranking score data associated with the data extraction template.

In one embodiment, at TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313 data representing the new data acceptance count associated with the data extraction template is weighted to transform the new data acceptance count data associated with the data extraction template into new ranking score data to be associated with the data extraction template.

In one embodiment, at TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313 data representing the new data acceptance count associated with the data extraction template is processed to transform the new data acceptance count data associated with the data extraction template into new ranking score data to be associated with the data extraction template using any processing procedure and rules desired, as discussed herein, and/or known/desired at the time of filing, and/or as known/desired after the time of filing.

In one embodiment, once data representing the transformed acceptance count data of TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303, i.e., the new data acceptance count data of TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311, is processed to transform the ranking score data associated with the data extraction template at TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313, process flow proceeds to SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 315.

In one embodiment, at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 315 the data extraction template data of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 and the data extraction template ranking score data for the data extraction template of TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313 are correlated and stored as ranked data extraction template data.

In one embodiment, ranked data extraction template data associated with two or more data extraction templates associated with the specific source document type are aggregated and stored.

In one embodiment, the ranked data extraction template data associated with two or more data extraction templates associated with the specific source document type are categorized according to the specific document type associated with the data extraction templates, and for which the data extraction templates are to be used to extract data.

In one embodiment, the ranked data extraction template data associated with two or more data extraction templates associated with the specific source document type are then aggregated and stored in a data extraction template database according to the category assigned to the data extraction templates, e.g., according to the source document type associated with the data extraction templates.

In one embodiment, when data extraction template data representing two or more data extraction templates associated with a given specific source document type are received, the ranking score data associated with data extraction templates is used to determine which of the data extraction templates is applied/used with new source documents of the specific document type, at least initially, at USE THE DATA EXTRACTION TEMPLATE TO EXTRACT DATA FROM THE RECEIVED SOURCE DOCUMENT OF THE SPECIFIC SOURCE DOCUMENT TYPE OPERATION 307.

In one embodiment, when a new source document of a specific source document type is received at RECEIVE SOURCE DOCUMENTS OF THE SPECIFIC SOURCE DOCUMENT TYPE OPERATION 305, the data extraction template database is searched to identify the one or more data extraction templates categorized as being associated with the specific source document type of the new source document.

In one embodiment, the extracted data is then presented to the data extraction template user for acceptance or rejection. In various embodiments, and in cases where multiple values for a particular field are detected, i.e., duplicate or redundant data is obtained, all such data are presented to the data extraction template user in a combo box or table. Then the data extraction template user is asked to select the correct data and when the data extraction template user selects the correct data, the data acceptance count for the data extraction template is increased at TRANSFORM A DATA ACCEPTANCE COUNT ASSOCIATED WITH THE DATA EXTRACTION TEMPLATE BASED ON THE USER ACCEPTANCE OR REJECTION OF THE DATA EXTRACTED OPERATION 311, thereby also increasing the ranking score associated with the data extraction template at TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313.

Given that the data ranking score associated with a given data extraction template is increased each time the data acceptance count for the data extraction template is increased, the result of the application of process 300 for managing user contributed data extraction templates using user acceptance data and ranking scores is a dynamic feedback driven ranking system of all the data extraction templates associated with a given source document type.

In one embodiment, as the ranking score associated with multiple data extraction templates associated with a specific source document type changes, the data extraction templates with the lowest data ranking scores are determined to be no longer relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

As another specific example, in one embodiment, a threshold data extraction template ranking score is established and any data extraction templates having a ranking score below the threshold data extraction template ranking score are dropped as new data extraction template data is received.

In one embodiment, once the data extraction template data of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 303 and the data extraction template ranking score data for the data extraction template of TRANSFORM A DATA EXTRACTION TEMPLATE RANKING SCORE FOR THE DATA EXTRACTION TEMPLATE BASED ON THE NEW DATA ACCEPTANCE COUNT DATA ASSOCIATED WITH THE DATA EXTRACTION TEMPLATE OPERATION 313 are correlated and stored as ranked data extraction template data at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 315, process flow proceeds to EXIT OPERATION 330.

In one embodiment, at EXIT OPERATION 330, process 300 for managing user contributed data extraction templates using user acceptance data and ranking scores is exited to await new data.

Using process 300 for managing user contributed data extraction templates using user acceptance data and ranking scores, acceptance feedback received directly from users of data extraction templates is used to determine the ranking score associated with the data extraction templates. Consequently, a feedback loop is created through which the data extraction templates are continuously and dynamically being improved to meet new environments, new documents, and new user needs.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for managing user contributed data extraction templates using weighted ranking score analysis comprising the following, which when executed individually or collectively by any set of one or more processors perform a process including:
   generating required number of fields data for a specific source document type indicating the required number of fields for which data is required to be extracted;
   receiving data extraction template data representing a data extraction template associated with the specific source document type;
   determining field hit count number data associated with the data extraction template;
   generating data field ratio term data for the data extraction template;
   assigning data field count weighting factor data to the data extraction template;
   using the data extraction template to extract data from received source documents of the specific source document type;
   monitoring the acceptance or rejection of data extracted from received source documents of the specific source document type using the data extraction template;
   generating data acceptance count data to be associated with the data extraction template;
   generating data acceptance ratio term data for the data extraction template;
   assigning data acceptance weighting factor data to the data extraction template;
   transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template;
   saving the data extraction template data and the data extraction template ranking score data for the data extraction template as ranked data extraction template data; and
   aggregating ranked data extraction template data associated with two or more data extraction templates associated with the specific source document type.

2. The computing system implemented method for managing user contributed data extraction templates using weighted ranking score analysis of claim 1 wherein the data extraction template data representing a data extraction template associated with a specific source document type is generated based, at least in part, on input data received from contributing users of a data management system associated with the computing system implemented method for managing user contributed data extraction templates using weighted ranking score analysis.

3. The computing system implemented method for managing user contributed data extraction templates using weighted ranking score analysis of claim 2 wherein the data management system is a financial management system.

4. The computing system implemented method for managing user contributed data extraction templates using weighted ranking score analysis of claim 1 further comprising:
   when a source document of the specific source document type is received, the two or more data extraction templates associated with the specific source document type are used in the order of highest data extraction template ranking scores to extract data from the source document recursively until data has been extracted for all of the required number of data fields for which data is required to be extracted for the specific source document type or all of the two or more data extraction templates associated with the specific source document type have been applied to the source document.

5. The computing system implemented method for managing user contributed data extraction templates using weighted ranking score analysis of claim 4 further comprising:
   increasing the data acceptance count associated with a data extraction template used to extract data from the source document whenever data extracted from the source using the template is deemed as correct and accepted by the user.

6. The computing system implemented method for managing user contributed data extraction templates using weighted ranking score analysis of claim 5 further comprising:
   transforming the data extraction template ranking score associated with the data extraction template used to extract data from the source document whenever data extracted from the source using the template is deemed as correct and accepted by the user to reflect the increase in the data acceptance count associated with the data extraction template used to extract accepted data.

7. The system for managing user contributed data extraction templates using weighted ranking score analysis of claim 6 further comprising:
   transforming the data extraction template ranking score associated with the data extraction template used to extract data from the source document to reflect a decrease in data acceptance ratio term data whenever data extracted from the source documents using the corresponding data extraction template is not accepted by the user.

8. The computing system implemented method for managing user contributed data extraction templates using weighted ranking score analysis of claim 1 wherein transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template includes:
   multiplying the data field ratio term data for the data extraction template by the data field count weighting factor data assigned to the data extraction template to generate weighted data field ratio term data for the data extraction template;
   multiplying the data acceptance ratio term data for the data extraction template by the data acceptance weighting factor data assigned to the data extraction template to generate weighted data acceptance ratio term data for the data extraction template; and adding the weighted data field ratio term data for the data extraction template to the weighted data acceptance ratio term data for the data extraction template to generate data extraction template ranking score data for the data extraction template.

9. The computing system implemented method for managing user contributed data extraction templates using weighted ranking score analysis of claim 8 wherein the data field ratio term data for the data extraction template is generated by dividing the field hit count number data associated with the data extraction template by the required number of fields data for the specific source document type.

10. The computing system implemented method for managing user contributed data extraction templates using weighted ranking score analysis of claim 8 wherein the data acceptance ratio term data for the data extraction template is generated by dividing the data acceptance count data associated with the data extraction template by the number of times the data extraction template has been applied to source documents of the source document type.

11. The computing system implemented method for managing user contributed data extraction templates using weighted ranking score analysis of claim 1 wherein the data field count weighting factor data assigned to the data extraction template is determined based, at least in part, on one or more data field count weighting factor parameters selected from the group of data field count weighting factor parameters consisting of:
   a determination of the type of data extraction template;
   a determination of the type of source document for which the data extraction template will eventually be used;
   a determination as to the age of the data extraction template;
   a determination as to the number of other data extraction templates associated with the specific type of source document; and
   any combination thereof.

12. The computing system implemented method for managing user contributed data extraction templates using weighted ranking score analysis of claim 1 wherein data acceptance weighting factor data assigned to the data extraction template is determined based, at least in part, on one or more data acceptance weighting factor parameters selected from the group of data acceptance weighting factor parameters consisting of:
   a determination of the type of data extraction template;
   a determination of the type of source document for which the data extraction template will eventually be used;
   a determination as to the age of the data extraction template;
   a determination as to the number of other data extraction templates associated with the specific type of source document; and
   any combination thereof.

13. The computing system implemented method for managing user contributed data extraction templates using weighted ranking score analysis of claim 1 further comprising:
   determining a threshold number of data extraction templates associated with a specific document type; and
   once the threshold number of data extraction templates associated with the specific document type is attained, eliminating a data extraction template associated with the specific document type having a lowest data extraction template ranking score before a new data extraction template associated with the specific document type is added.

14. A system for managing user contributed data extraction templates using weighted ranking score analysis comprising:
   at least one processor; and
   at least one memory coupled to the at least one processor, the at least one memory having stored therein instructions which when executed by any set of the one or more processors, perform a process for managing user contributed data extraction templates using weighted ranking score analysis, the process for managing user contributed data extraction templates using weighted ranking score analysis including:
   generating required number of fields data for a specific source document type indicating the required number of fields for which data is required to be extracted;
   receiving data extraction template data representing a data extraction template associated with the specific source document type;
   determining field hit count number data associated with the data extraction template;
   generating data field ratio term data for the data extraction template;
   assigning data field count weighting factor data to the data extraction template;
   using the data extraction template to extract data from received source documents of the specific source document type;
   monitoring the acceptance or rejection of data extracted from received source documents of the specific source document type using the data extraction template;
   generating data acceptance count data to be associated with the data extraction template;
   generating data acceptance ratio term data for the data extraction template;
   assigning data acceptance weighting factor data to the data extraction template;
   transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template;
   saving the data extraction template data and the data extraction template ranking score data for the data extraction template as ranked data extraction template data; and
   aggregating ranked data extraction template data associated with two or more data extraction templates associated with the specific source document type.

15. The system for managing user contributed data extraction templates using weighted ranking score analysis of claim 14 wherein the data extraction template data representing a data extraction template associated with a specific source document type is generated based, at least in part, on input data received from contributing users of a data management system associated with the computing system implemented method for managing user contributed data extraction templates using weighted ranking score analysis.

16. The system for managing user contributed data extraction templates using weighted ranking score analysis of claim 15 wherein the data management system is a financial management system.

17. The system for managing user contributed data extraction templates using weighted ranking score analysis of claim 14 further comprising:

when a source document of the specific source document type is received, the two or more data extraction templates associated with the specific source document type are used in the order of highest data extraction template ranking scores to extract data from the source document recursively until data has been extracted for all of the required number of data fields for which data is required to be extracted for the specific source document type or all of the two or more data extraction templates associated with the specific source document type have been applied to the source document.

18. The system for managing user contributed data extraction templates using weighted ranking score analysis of claim 17 further comprising:
increasing the data acceptance count associated with a data extraction template used to extract data from the source document whenever data extracted from the source using the template is deemed as correct and accepted by the user.

19. The system for managing user contributed data extraction templates using weighted ranking score analysis of claim 18 further comprising:
transforming the data extraction template ranking score associated with the data extraction template used to extract data from the source document to reflect a decrease in the data acceptance ratio term data whenever data extracted from the source document using the corresponding data extraction template is not accepted by the user.

20. The system for managing user contributed data extraction templates using weighted ranking score analysis of claim 19 further comprising:
transforming the data extraction template ranking score associated with the data extraction template used to extract data from the source document whenever data extracted from the source using the template is deemed as correct and accepted by the user to reflect the increase in the data acceptance count associated with the data extraction template used to extract accepted data.

21. The system for managing user contributed data extraction templates using weighted ranking score analysis of claim 14 wherein transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template includes:
multiplying the data field ratio term data for the data extraction template by the data field count weighting factor data assigned to the data extraction template to generate weighted data field ratio term data for the data extraction template;
multiplying the data acceptance ratio term data for the data extraction template by the data acceptance weighting factor data assigned to the data extraction template to generate weighted data acceptance ratio term data for the data extraction template; and
adding the weighted data field ratio term data for the data extraction template to the weighted data acceptance ratio term data for the data extraction template to generate data extraction template ranking score data for the data extraction template.

22. The system for managing user contributed data extraction templates using weighted ranking score analysis of claim 21 wherein the data field ratio term data for the data extraction template is generated by dividing the field hit count number data associated with the data extraction template by the required number of fields data for the specific source document type.

23. The system for managing user contributed data extraction templates using weighted ranking score analysis of claim 21 wherein the data acceptance ratio term data for the data extraction template is generated by dividing the data acceptance count data associated with the data extraction template by the number of times the data extraction template has been applied to source documents of the source document type.

24. The system for managing user contributed data extraction templates using weighted ranking score analysis of claim 14 wherein the data field count weighting factor data assigned to the data extraction template is determined based, at least in part, on one or more data field count weighting factor parameters selected from the group of data field count weighting factor parameters consisting of:
a determination of the type of data extraction template;
a determination of the type of source document for which the data extraction template will eventually be used;
a determination as to the age of the data extraction template;
a determination as to the number of other data extraction templates associated with the specific type of source document; and
any combination thereof.

25. The system for managing user contributed data extraction templates using weighted ranking score analysis of claim 14 wherein data acceptance weighting factor data assigned to the data extraction template is determined based, at least in part, on one or more data acceptance weighting factor parameters selected from the group of data acceptance weighting factor parameters consisting of:
a determination of the type of data extraction template;
a determination of the type of source document for which the data extraction template will eventually be used;
a determination as to the age of the data extraction template;
a determination as to the number of other data extraction templates associated with the specific type of source document; and
any combination thereof.

26. The system for managing user contributed data extraction templates using weighted ranking score analysis of claim 14 further comprising:
determining a threshold number of data extraction templates associated with a specific document type; and
once the threshold number of data extraction templates associated with the specific document type is attained, eliminating a data extraction template associated with the specific document type having a lowest data extraction template ranking score before a new data extraction template associated with the specific document type is added.

27. A computer program product for managing user contributed data extraction templates using weighted ranking score analysis comprising:
a nontransitory computer readable medium;
and computer program code, encoded on the nontransitory computer readable medium, comprising computer readable instructions which, when executed via any set of one or more processors, perform the following:
generating required number of fields data for a specific source document type indicating the required number of fields for which data is required to be extracted;

receiving data extraction template data representing a data extraction template associated with the specific source document type;

determining field hit count number data associated with the data extraction template;

generating data field ratio term data for the data extraction template;

assigning data field count weighting factor data to the data extraction template;

using the data extraction template to extract data from received source documents of the specific source document type;

monitoring the acceptance or rejection of data extracted from received source documents of the specific source document type using the data extraction template;

generating data acceptance count data to be associated with the data extraction template;

generating data acceptance ratio term data for the data extraction template;

assigning data acceptance weighting factor data to the data extraction template;

transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template;

saving the data extraction template data and the data extraction template ranking score data for the data extraction template as ranked data extraction template data; and aggregating ranked data extraction template data associated with two or more data extraction templates associated with the specific source document type.

28. The computer program product for managing user contributed data extraction templates using weighted ranking score analysis of claim 27 wherein the data extraction template data representing a data extraction template associated with a specific source document type is generated based, at least in part, on input data received from contributing users of a data management system associated with the computing system implemented method for managing user contributed data extraction templates using weighted ranking score analysis.

29. The computer program product for managing user contributed data extraction templates using weighted ranking score analysis of claim 27 further comprising:

when a source document of the specific source document type is received, the two or more data extraction templates associated with the specific source document type are used in the order of highest data extraction template ranking scores to extract data from the source document recursively until data has been extracted for all of the required number of data fields for which data is required to be extracted for the specific source document type or all of the two or more data extraction templates associated with the specific source document type have been applied to the source document.

30. The computer program product for managing user contributed data extraction templates using weighted ranking score analysis of claim 27 wherein transforming the data field ratio term data for the data extraction template, the data field count weighting factor data assigned to the data extraction template, the data acceptance ratio term data for the data extraction template, and the data acceptance weighting factor data assigned to the data extraction template into data extraction template ranking score data for the data extraction template includes:

multiplying the data field ratio term data for the data extraction template by the data field count weighting factor data assigned to the data extraction template to generate weighted data field ratio term data for the data extraction template;

multiplying the data acceptance ratio term data for the data extraction template by the data acceptance weighting factor data assigned to the data extraction template to generate weighted data acceptance ratio term data for the data extraction template; and adding the weighted data field ratio term data for the data extraction template to the weighted data acceptance ratio term data for the data extraction template to generate data extraction template ranking score data for the data extraction template.

31. The computer program product for managing user contributed data extraction templates using weighted ranking score analysis of claim 30 wherein the data field ratio term data for the data extraction template is generated by dividing the field hit count number data associated with the data extraction template by the required number of fields data for the specific source document type.

32. The computer program product for managing user contributed data extraction templates using weighted ranking score analysis of claim 30 wherein the data acceptance ratio term data for the data extraction template is generated by dividing the data acceptance count data associated with the data extraction template by the number of times the data extraction template has been applied to source documents of the source document type.

33. The computer program product for managing user contributed data extraction templates using weighted ranking score analysis of claim 27 wherein the data field count weighting factor data assigned to the data extraction template is determined based, at least in part, on one or more data field count weighting factor parameters selected from the group of data field count weighting factor parameters consisting of:

a determination of the type of data extraction template;

a determination of the type of source document for which the data extraction template will eventually be used;

a determination as to the age of the data extraction template;

a determination as to the number of other data extraction templates associated with the specific type of source document; and any combination thereof.

34. The computer program product for managing user contributed data extraction templates using weighted ranking score analysis of claim 27 wherein data acceptance weighting factor data assigned to the data extraction template is determined based, at least in part, on one or more data acceptance weighting factor parameters selected from the group of data acceptance weighting factor parameters consisting of:

a determination of the type of data extraction template;

a determination of the type of source document for which the data extraction template will eventually be used;

a determination as to the age of the data extraction template;

a determination as to the number of other data extraction templates associated with the specific type of source document; and any combination thereof.

35. The computer program product for managing user contributed data extraction templates using weighted ranking score analysis of claim 27 further comprising:

determining a threshold number of data extraction templates associated with a specific document type; and once the threshold number of data extraction templates associated with the specific document type is attained, eliminating a data extraction template associated with the specific document type having a lowest data extraction template ranking score before a new data extraction template associated with the specific document type is added.

\* \* \* \* \*